US006646683B1

(12) United States Patent
Mandle

(10) Patent No.: US 6,646,683 B1
(45) Date of Patent: Nov. 11, 2003

(54) IRIS CONTROL OF A CCD CAMERA USING SELECTIVE WELL DUMPING

(75) Inventor: Gary Mandle, Mahwah, NJ (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/353,731

(22) Filed: Jul. 14, 1999

(51) Int. Cl.[7] .............................................. H04N 5/335
(52) U.S. Cl. ...................................... 348/299; 296/314
(58) Field of Search ............................... 348/241, 248, 348/249, 250, 294, 295, 296, 297, 298, 299, 311, 312, 314, 252; 250/208.1

(56) References Cited

U.S. PATENT DOCUMENTS 5,631,705 A * 5/1997 Tani ............................. 348/314
6,351,284 B1 * 2/2002 Watanabe et al. ........... 348/312
6,480,226 B1 * 11/2002 Takahashi et al. .......... 348/296

* cited by examiner

Primary Examiner—Tuan Ho
(74) Attorney, Agent, or Firm—Frommer Lawrence & Haug LLP; William S. Frommer; Gordon Kessler

(57) ABSTRACT

A method and apparatus for applying a selective shutter to an imaging device. An image is received via a CCD unit and a portion of the received image that presents an overflow condition is determined. The amount of time light from the portion of the image presenting an overflow condition is received is selectively reduced so as to eliminate the overflow condition. The CCD unit comprises a plurality of individual imaging elements which receive light from the image for a time period corresponding to a predetermined duty cycle. Individual imaging elements corresponding to the portion of the received image that presents the overflow condition are connected to a current drain for a determined amount of time during the duty cycle, and this reduces the amount of time the determined portion of the image receives light.

18 Claims, 5 Drawing Sheets

IRIS CONTROL OF A CCD CAMERA USING SELECTIVE WELL DUMPING

BACKGROUND OF THE INVENTION

The invention relates generally to an electronic camera and more particularly to an electronic camera employing a charge coupled device (CCD) for imaging and recording an image. Conventional digital video cameras generate a video signal by employing such a CCD image pickup device to store a plurality of image pixels, each corresponding to one of a plurality of image elements within the CCD device. Typically, each of these imaging elements comprises a MOS capacitor arranged in a grid. Each MOS capacitor performs a photoelectric conversion, a charge accumulation, and a charge transfer. When light shines on a particular MOS capacitor, the capacitor creates a signal charge which varies directly with the amount of incident light. The amount of charge that is able to be stored in a particular MOS capacitor can be defined by the application of a predetermined voltage to the MOS capacitor. Thus, by the application of a predetermined voltage a predetermined amount of charge can be stored in this MOS capacitor. Such a charge holder is called a "well". Once a charge has been stored within the capacitor, it is possible to transfer this charge to another capacitor well, if the other well is deeper (i.e. has a greater voltage applied thereto). This characteristic allows for the systematic storage of a charge related to an amount of light received at each of a plurality of CCD imaging elements, and thereafter the transfer of the stored charges from each imaging element through an appropriate system to record the amount of light received by each capacitor in an imaging system to reproduce the image pixel by pixel.

Each capacitor unit of the CCD imaging device is designed to receive an amount of light within a predetermined range. Thus, the well formed by each capacitor unit receives light, moving from an empty charge state to a full charge state. After a particular capacitor unit receives enough light that its well is full, additional charge is siphoned off and dumped to an overflow drain. Thus, a maximum storable charge has been exceeded. Upon overflow, the display of a pixel will all appear plain white. A problem arises in that if all of the capacitors in an area of an image have received more than a predetermined amount of light, thus exceeding the maximum charge, all of these pixels will appear white, with no distinction between them. This is because once an element has received all of the light it is designed to receive, a charge completely filling its well is generated. The pixel is thus 100% white, and no additional light can be received thereby or charge can be stored therein. Thus, where there may be an actual difference between the light received by various pixels of the imaging device, once reaching a maximum, the CCD device determines that each of these elements should be displayed identically. Thus, differences between light received by pixels that is above an upper threshold is not accounted for.

In order to remedy this situation, conventional CCD cameras allow for the use of a shutter, either physical or electronic in order to reduce the light received by the entire CCD device. When using a physical shutter, the amount of light allowed to enter the lens is reduced, by reducing the aperture size of the camera as in a typical chemical photography camera. Thus, the size of the objective lens is stopped down, and therefore less light is received. Alternatively, it is possible to employ an electronic shutter, in which a reduced amount of time is allowed for light to reach each of the imaging elements. In this manner, overflow is avoided.

However, in each of these cases, either the physical or electronic shutter acts on the entire image. Therefore, if certain portions of the image are bright, while others are dark, the use of the shutter to reduce the amount of light received by the entire imaging device, while possibly improving the resolution between pixels at the bright end of the spectrum, is likely to reduce the resolution of images at the darker end of the spectrum. If a user is taking a picture of an image that includes bright sunlight, and a shadow, typically the user will have to choose between being able to distinguish elements within the shadow or elements within the bright light.

Therefore, it would be beneficial to provide an improved method and apparatus that overcomes these drawbacks of the prior art.

OBJECTS OF THE INVENTION

It is an object of the invention to provide an improved CCD imaging device capable of accurately recording an image including a variety of light conditions.

Another object of the invention is to provide an improved CCD imaging device in which a portion of an image having a high light content, and a portion of an image having a low light content can each be imaged and stored simultaneously at an acceptable resolution and contrast.

A further object of the invention is to provide an improved CCD imaging device that determines portions of a picture to be imaged that are candidates for reduction in the amount of light to be received, and other portions of the image that are candidates for increases in the amount of light received, and independently adjusts the CCD elements corresponding to these portions of the picture accordingly.

A still further object of the invention is to provide an improved CCD imaging device which allows for the automatic detection and control of various areas of a picture to be imaged, and which adjusts the amount of time available in each predetermined area for receiving light from the picture to be imaged in order to improve the resolution between pixels within each area.

Still other objects and advantages of the invention will in part be obvious and will in part be apparent from the specification and the drawings.

SUMMARY OF THE INVENTION

Generally speaking, in accordance with the invention, an improved CCD imaging device is provided for imaging and recording a received picture. The improved CCD imaging device in accordance with the invention is constructed so that first a picture to be stored is recorded and tested. During this test, areas of the image that may produce an overflow of the CCD imaging pixel elements, or which may not produce enough light for the CCD imaging pixel elements are identified. An edge detector is then utilized to determine the boundaries between these particular areas and the remainder of the picture. After determining various areas which are to have the amount of light received thereby altered, a determination is made as to what percentage of the received light should be received upon correction. Thus, very bright subjects will be corrected to receive a smaller amount of the normally received light, while very dark areas in the picture will be adjusted to receive more than a normal amount of light. After correction of the various areas, subsequent images are stored, and thus areas which would typically be too bright are reduced in light to provide proper contrast, while areas that would typically be too dark are also adjusted to provide proper contrast. In this manner a selective electronic shutter is applied to various portions of a picture to be imaged and recorded, thereby allowing for changes in exposure time (or other mechanisms) for adjusting the amount of light received by a particular pixel without adjusting the amount of light received by other pixels in the image.

The invention accordingly comprises the several steps and the relation of one or more of such steps with respect to each of the others, and the apparatus embodying features of construction, combinations of elements and arrangement of parts that are adopted to affect such steps, all as exemplified in the followed detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 3A is a plan view of an individual imaging element, and surrounding structure of the CCD imaging device of FIG. 2;

DETAILED DESCRIPTION OF THE PREFERRED EMBODIMENTS

Figure 1:
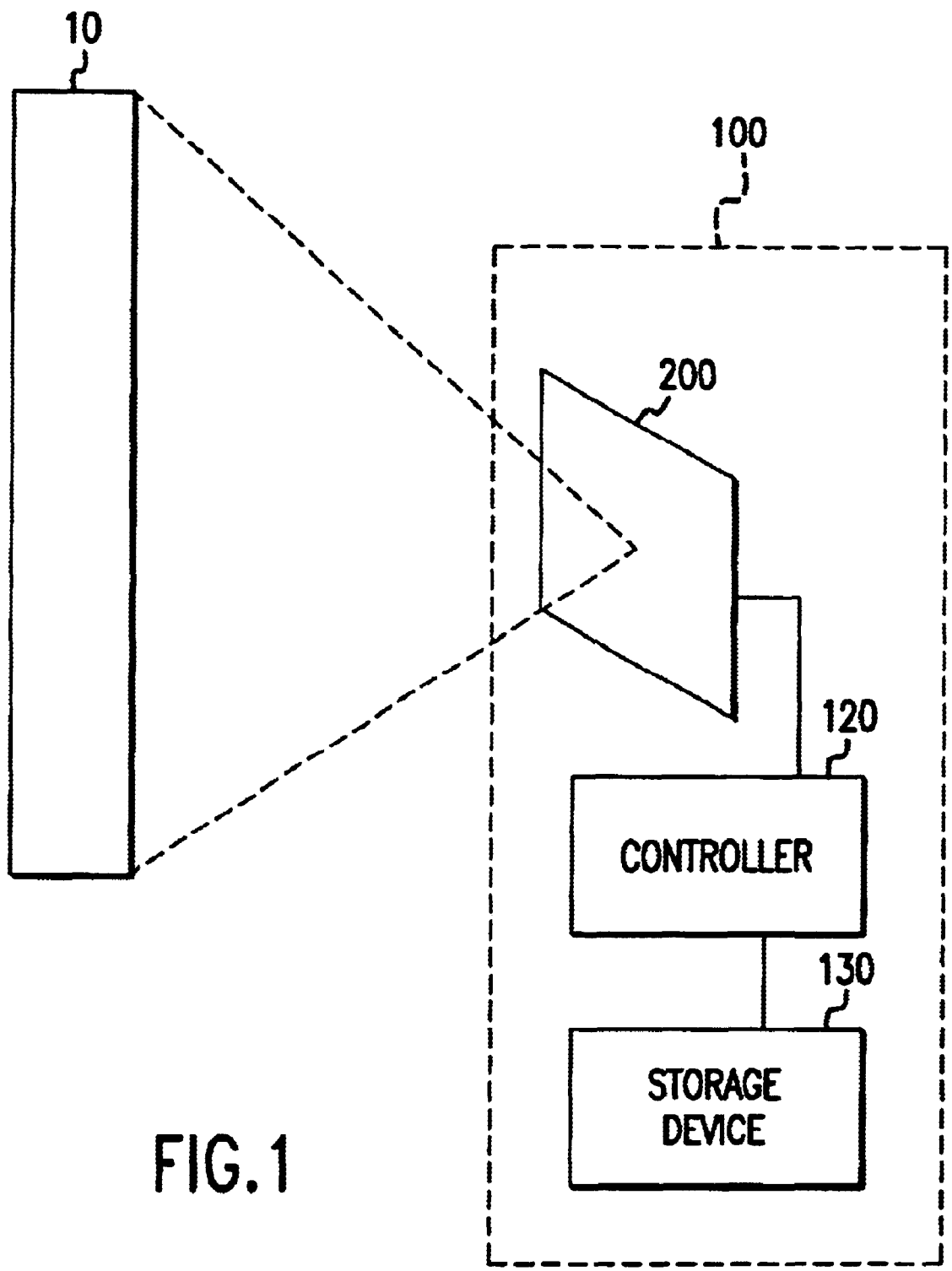
FIG. 1 is a schematic view of a CCD imaging device constructed in accordance with the invention.
Figure 2:
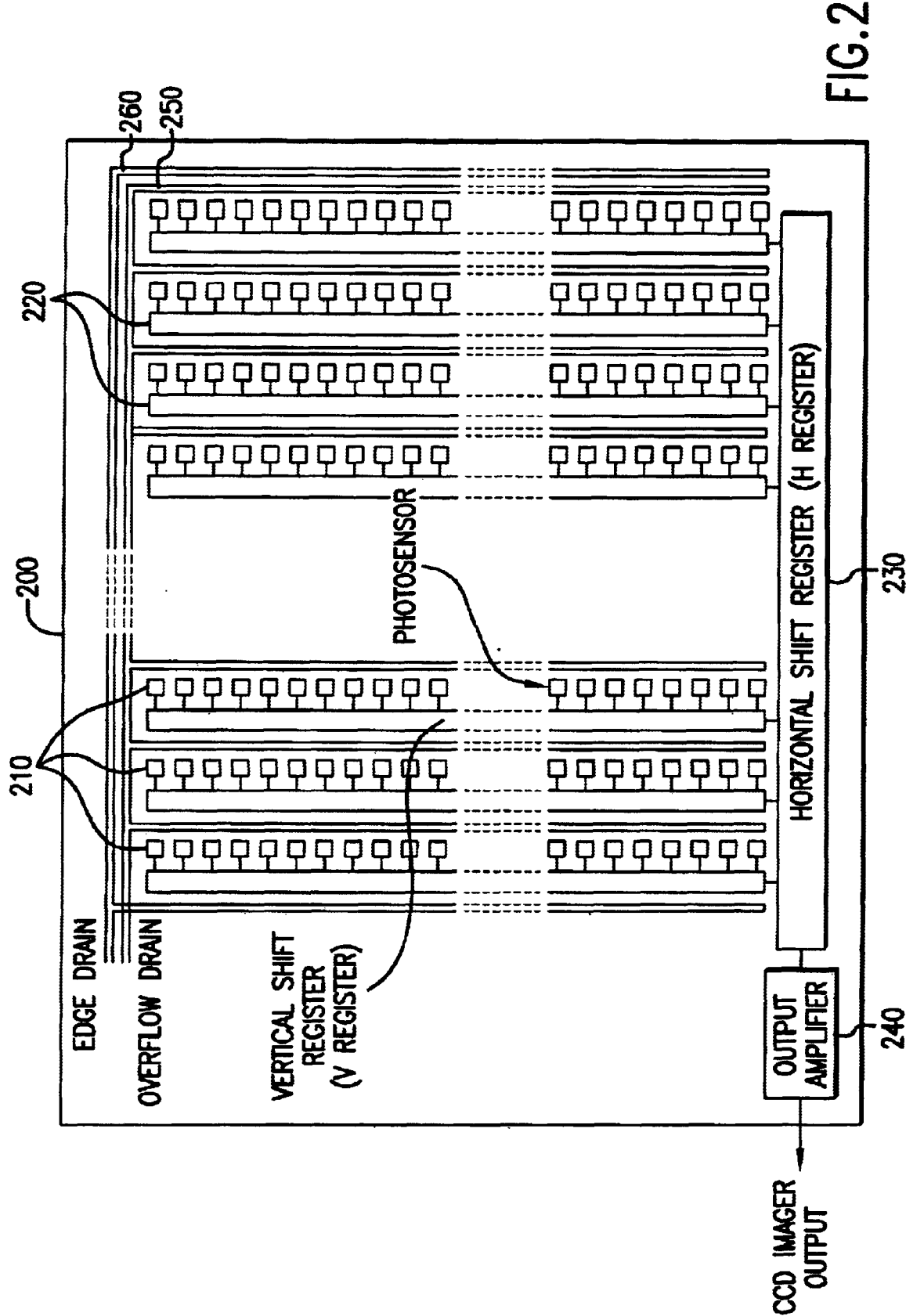
FIG. 2 is a plan view of the constituent imaging elements of a CCD imaging device.
Figure 3B:
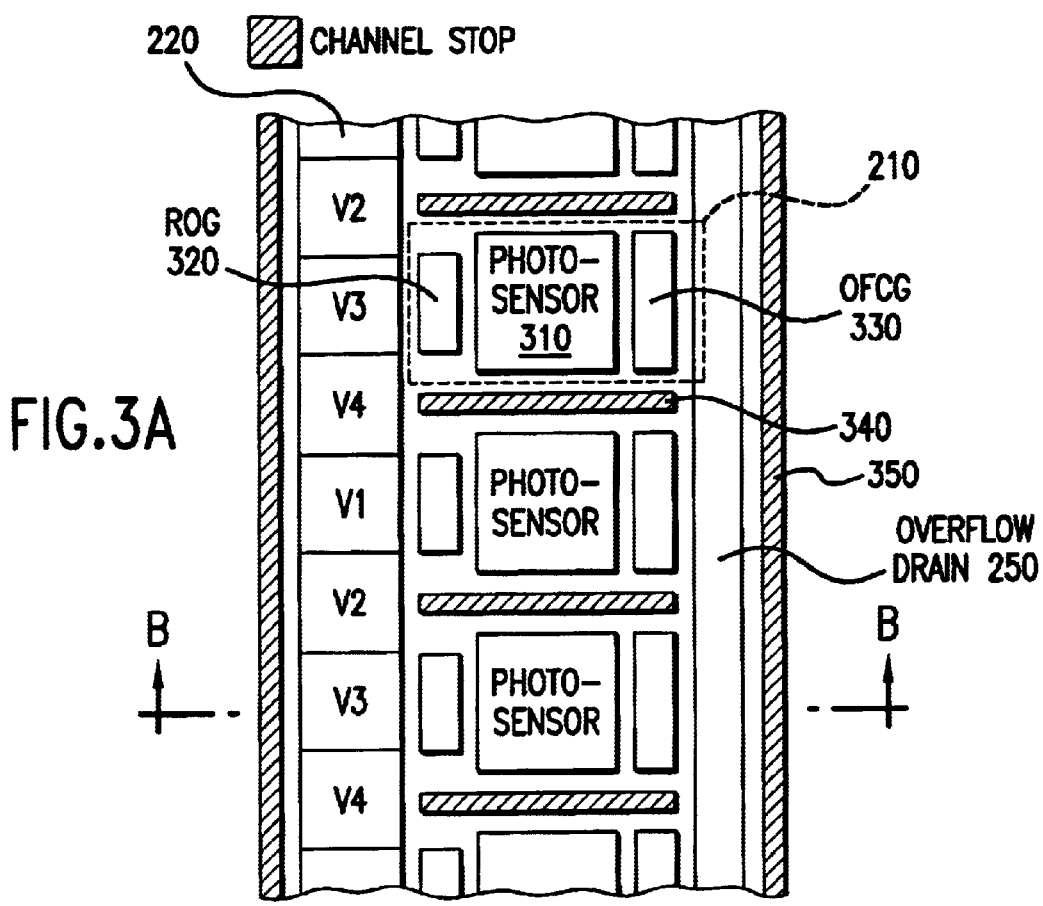
FIG. 3B is a graph depicting various potential levels of the individual components of the imaging element of FIG. 3A.
Figure 3B:
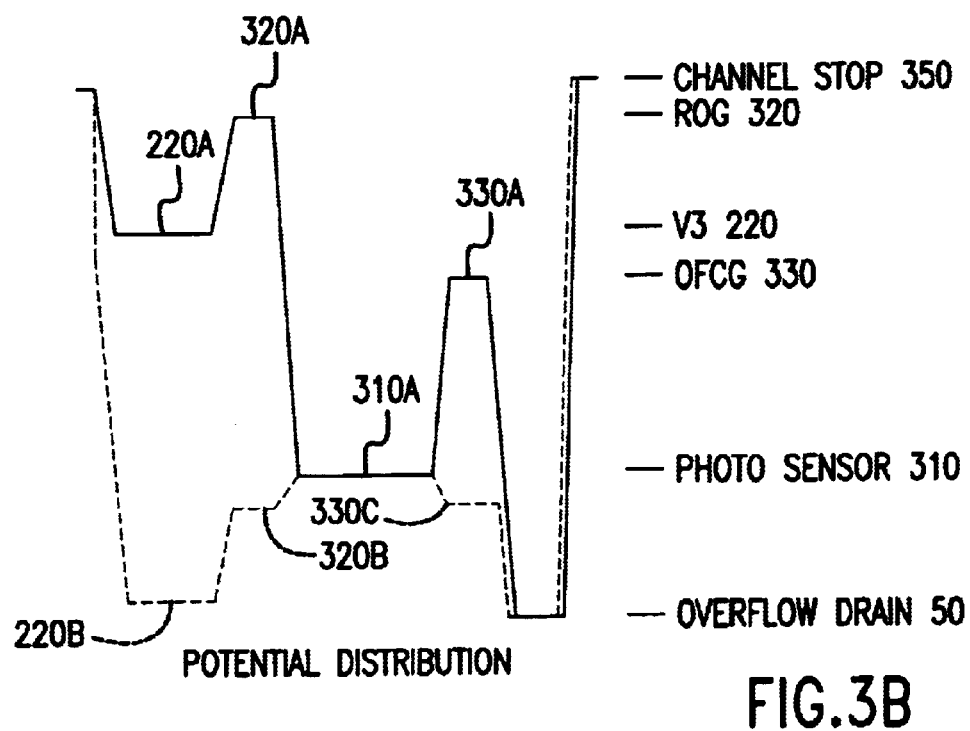

Referring first to FIGS. 1–3, a CCD imaging device 100 constructed in accordance with the invention is shown. CCD imaging device 100 includes a CCD imaging unit 200, the output of which is coupled to a storage device 130 via a controller 120. As is shown in FIG. 1, the image of an object 10 is directed towards CCD imaging unit 200, and light reflected from the object to be imaged is captured by the CCD unit. Upon appropriate processing which will be described below, a charge indicative of a light value for each pixel is sequentially output from CCD unit 200 under the control of controller 120. This information is then passed on to storage device 130 where it is stored as a completely constituted single image. In this manner, when imaging a plurality of images consecutively, such as in a moving picture, each image that is imaged by CCD imaging unit is sequentially passed by the controller and stored in the storage device as a complete reconstructed image.

CCD imaging unit 200 is shown in more detail in FIG. 2. CCD imaging unit 200 includes a plurality of imaging elements 210, a plurality of vertical shift registers 220, each vertical shift register having a predetermined plurality of imaging elements 210 electrically coupled thereto, a horizontal shift register 230, each of the vertical shift registers being electrically coupled with the horizontal shift register, and an output amplifier 240 for providing an output from CCD imaging unit 200. CCD imaging unit 200 also includes an overflow drain 250 coupled with each imaging element to receive excess charge therefrom, and an edge drain 260 acting as a common ground.

During use, an individual isolated charge is accumulated in each of imaging elements 210 corresponding to the amount of light incident upon the respective imaging element during a predetermined time period for exposure. Upon accumulation of this charge in each imaging element, these charges are output from each of the imaging elements to the corresponding vertical shift register. Thus, each vertical shift register receives a value from each imaging element, in the same sequence as imaging elements 210 are positioned. After being placed in each corresponding vertical shift register 220, the charge information is further transferred therefrom to horizontal shift register 230, one charge at a time in an order corresponding to the position of the vertical shift registers, and the position of a particular charge within its respective vertical shift register. Thus, horizontal shift register 230 will receive a first picture element from the first vertical shift register 220, a first picture element from the second vertical shift register, and so on until the first picture element from all the vertical shift registers have been transferred. Thereafter, the second picture element from the first vertical shift register, the second picture element from the second vertical shift register and so on will be transferred, until all picture elements of all vertical shift registers for a particular frame have been transferred. Alternatively, all of the stored charges from a particular vertical shift register can be transferred to the horizontal shift register before any stored charges from a next vertical shift register is transferred. These charges are then transferred from horizontal shift register 230 sequentially to output amplifier 240. These sequential values are output from CCD imaging unit 200 via controller 120 and stored in storage device 130, where they are consecutively processed to reconstruct a single image (see FIG. 1). In this manner, an electronic imaging comprising a plurality of imaging elements can be determined, transferred and stored.

Referring next to FIG. 3A, an individual imaging element 210, along with its connections to associated vertical shift register 220 and overflow drain 250 will be described. As is shown in FIG. 3A, a single imaging element 210 includes a photosensor 310, a read-out gate (ROG) 320, and an overflow control gate (OFCG) 330. Channel stops 340 are positioned between adjacent imaging elements 210 and act to insulate the various imaging elements 210 from each other. Photosensor 310 comprises the main portion of each imaging element, allowing for the determination of the amount of light energy that is received at the imaging element. As will be discussed below, a drive signal is driven to enable and disable of OFCG 330 of the associated photosensor 310, to therefore determine the time period for which light energy is to be received.

All of the photosensors 310 of each imaging unit operate in accordance with the same drive signal, and therefore each photosensor is open to receive light for the same predetermined period of time as all the other photosensors. After the time period for collection of light has been completed, the photosensors do not accept any more light, and a current charge value indicative of the amount of light that was received by each particular photosensor is stored in an associated well. Thereafter, in accordance with instructions from controller 120, the charge value stored in each sensor well is read out via the associated read out gate 320 to an associated portion of the associated vertical shift register 220 as appropriate. After being read out, the charge value is stored in the vertical shift register, and is sequentially shifted downward in FIG. 2 into horizontal shift register 230, and output from imaging unit 200 via output amplifier 240.

During use, if a particular well associated with a particular photosensor 310 has received more than a predetermined amount of light energy, the specific photosensor will be saturated and will not be able to accept any additional light energy. At this point, the stored charge value for the photosensor will be at its maximum, and all additional charge to be built up thereon generated from additional incident light energy will pass through the associated overflow control gate 330 into overflow drain 250, where the charge will be discarded. Thus in this manner, additional charge in excess of a predetermined amount is removed from each photosensor 310.

FIG. 3B depicts the voltage potential distribution of the elements of FIG. 3A while light energy is being collected by each photosensor 310, the solid line indicating the standard light collecting state. In FIG. 3B, an application of a higher voltage potential to a particular component of imaging element 210 results in a deeper "well". Thus, as is shown, overflow drain 250 has the highest voltage applied thereto, and therefore forms the deepest well. Photosensor 310 has a voltage applied thereto that is greater than the voltage of either the overflow control gate or the read out gate, thus forming a well for collecting charge. This type of graph is convenient in describing such an application, because charge flows between the elements and wells as if it were water. Thus, charge is stored in an area of the curve, such as the portion of the curve corresponding to photosensor 310, until it reaches a certain predetermined level, the voltage level of overflow gate 330. After reaching this level, the charge then overflows overflow gate 330, and is stored and drained from overflow drain 250. While overflow drain 250 is shown with a bottom lower value, the overflow drain acts as an infinite sink.

Therefore, as is shown in FIG. 3B, light is received by photosensor 310, and charge is built up therein. If the stored charge is below a predetermined value, specifically the voltage of overflow gate 330, this charge will be stored within the portion of the curve associated with photosensor 310. As noted above, if more than this amount of charge is received, the excess charge will flow over overflow gate 330, into overflow drain 250.

After the time period for collecting light energy and charge associated therewith has ended, read out gate is then operable to read this charge out from the photosensor 310 to the associated vertical shift register 220. Thus, as is shown in FIG. 3B, the potential of each read out gate 320 is dropped from level 320A to level 320B as indicated by the dashed line. Additionally, in accordance with a control signal, the potential of the associated portion of vertical shift register 220 is reduced from level 220A to 220B in FIG. 3B. Thus, in accordance with a sequence of control signals, the charge stored in the well associated with each photosensor at position 310A in FIG. 3B flows through read out gate 320 at potential level 320B into the associated portion of vertical shift register 220 at voltage level 220B. In this manner, the accumulated charge is transferred to the appropriate associated section of vertical shift register 220. Thereafter, a similar procedure is followed whereby the voltage potential of each consecutive portion of vertical shift register 220 is lowered so that the charge is transferred therefrom to the next portion of vertical shift register 220 going down in the vertical direction as shown in FIG. 2. Eventually, each of the stored charges is transferred to horizontal shift register 230, and is in the same manner transferred via output amplifier 240 out from CCD imaging unit 200.

As is noted above, in a conventional apparatus, overflow control gate 330 is set to a potential 330A, and this voltage potential is set identically for each imaging element 210 of CCD imaging unit 220. Thus, the dynamic range for receiving light is identical for each element of the CCD imaging unit. Therefore, by way of example, if overflow control gate 330 were set to an arbitrary value of 100 (this number is used for comparison purposes only, and does not comprise any particular value), then the dynamic range of charge storage would be from 0 to 100. If light corresponding to 99 or fewer units were received by photosensor 310, then the charge stored within photosensor 310 at section 310A and FIG. 3B would be an accurate relative representation of the received light energy. However, if during a predetermined time period photosensor 310 had received 101 units or 350 units, photosensor 310 would retain only 100 units at location 310A of FIG. 3B, all the additional units flowing over overflow control gate 330 at voltage 330A of FIG. 3B into overflow drain 250. The image portion corresponding to these photosensors would all turn out to be white or the brightest possible color that is shown in the image, but relative differences between the values thereof could not be shown. Thus if a very bright highlight were included in a portion of the image, this portion of the image would produce a whiteout. As noted in the Background of the Invention, if an attempt is made to reduce the brightness of the image overall so as to improve the resolution in the bright portion, it is likely that the resolution and contrast in darker portions of the image would be adversely affected.

Therefore, in accordance with the invention, the inventor has proposed an apparatus and method wherein the value of the overflow control gate 330, and specifically the voltage potential 330A thereof in FIG. 3B is altered as necessary in order to account for areas of the image which are too bright or too dark to be received in a standard picture. Thus, in accordance with the invention, a plurality of imaging elements 210 is tested, and a portion of an image is determined to be too bright, causing an overflow condition. The boundaries of this area are then precisely determined, and the average overflow brightness in this area is also determined. A desired percentage reduction in the amount of light energy received by this area is then calculated. After the area has been defined, and the desired percentage reduction has been calculated, the voltage potential 330A of each of the overflow control gates associated with the imaging elements contained in the defined area are set to a level less than that of the voltage potential 310A of each associated photosensor 310 for a predetermined amount of time at the beginning of the time period for collecting light, according to the desired percentage reduction. Therefore, as shown in FIG. 3B, the voltage potential 330A is reduced to voltage potential 330C. In the particular image elements having such a reduced potential of the overflow control gate, charge collected by the appropriate photosensor 310 is not stored therein, but is immediately drained into overflow drain 250 through overflow control gate 330 having the reduced voltage potential.

This reduced voltage potential for the appropriate overflow control gates 330 is employed for a predetermined amount of time corresponding to the desired percent decrease in the amount of light to be received in the corresponding area of the image. Thus, if a fifty percent reduction of light were desired, the reduced voltage potential 330C of overflow control gate 330 would be employed for fifty percent of the cycle time during which the photosensors were to receive light. After this appropriate time period has been completed, the voltage potential of the overflow control gates 330 would be raised once again to the level at 330A and light would begin to be captured and stored by the photosensor. This implementation effectively reduces the amount of time for a particular desired area of the image to receive light. Thus, while not affecting areas of the image that are not to be adjusted, those areas which previously would have received too much light are now essentially on a shorter duty cycle, and will receive a smaller amount of light than previously intended. As a result, those portions of the image can be prevented from resulting in a whiteout situation. The details associated with the determination of areas of the image which should have the method and apparatus of the invention applied thereto, along with the determination of the appropriate percentage of time to reduce the light flowing to the photosensor will be now discussed.

Figure 4:
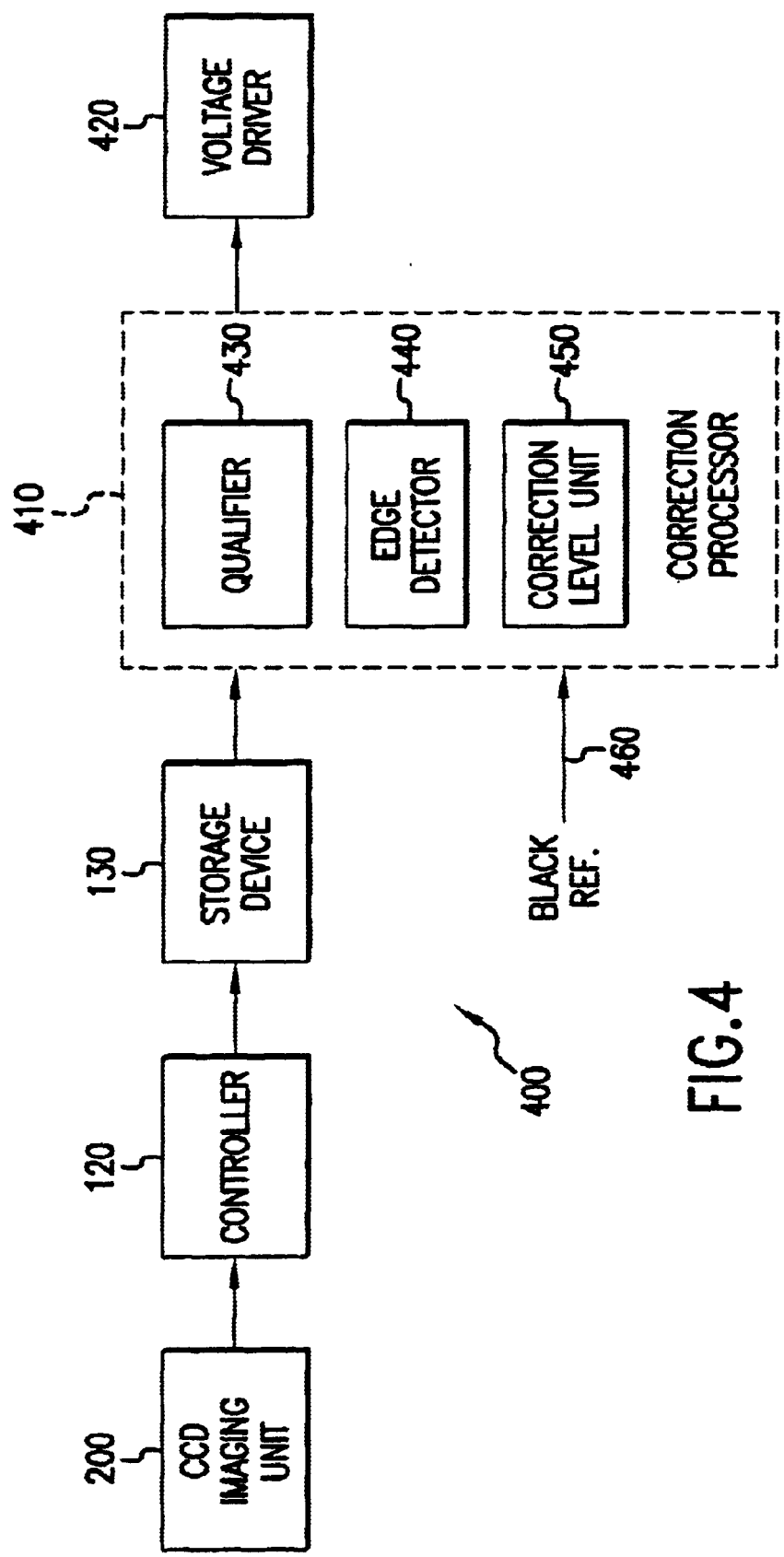
FIG. 4 is a flow diagram depicting the flow of operation of the CCD imaging device of the invention.

Referring next to FIG. 4, an apparatus 400 for implementing the invention is shown. This apparatus includes, as originally shown in FIG. 1, CCD imaging unit 200, controller 120 and storage device 130. Additionally, the apparatus includes a correction processor 410 and a voltage driver 420 for driving the input voltage to the overflow control gate as shown in FIGS. 3A and 3B. Correction processor 410 comprises a qualifier 430, an edge detector 440, and a correction level unit 450. Correction processor 410 also receives a black reference 460 as a base line.

As noted with respect to FIG. 1, during use, each element of a frame is imaged by CCD imaging unit 200, one frame at a time in storage device 130 under the control of controller 120. This information is passed frame-by-frame from storage device 130 to correction processor 410. In a preferred embodiment, an image corresponding to a green color is used for testing, since green makes up more than half of the image brightness. However, any color combination can be used. Correction processor 410 performs three functions. First, the correction processor determines whether a portion of the image received from storage device 130 is a candidate for correction. After it is determined that a portion of the image is a candidate for correction, edge detector 440 defines the precise edge of the area to be corrected and then correction level unit 450 determines the amount of correction that is to be provided. In accordance with the outputs of these three units, correction processor 410 provides a control signal to voltage driver 420 indicating how the voltage provided to various overflow control gates should be applied. Voltage driver 420 then provides appropriate voltage potentials to the desired overflow control gates associated with the area to be corrected. The operation of correction processor 410 will now be described in greater depth.

Referring next to FIG. 5 in addition to FIG. 4, the operation of qualifier 430 will be described. For determining a portion of an image to be corrected, it is necessary first to ensure that a possible detected image is one that a user would want to be corrected. For example, if a mirror, glass or other shiny object were a central focal point of an image, and a light hitting such an object generated a sparkle, or other intense light, it is unlikely that the photographer would want to correct this portion of the image, since the object is the focal point of the image. However, if in a panoramic picture, the sky were too bright or too dark, or the ground were too bright or too dark, or alternatively material positioned along the side edges of the image were too bright or too dark, it would be desirable for a user to adjust these portions of the image. Therefore, rather than for correcting spot errors present in a specific object being focused upon, the invention contemplates correcting large scale errors of background and other less important information in the image. Of course, the method and apparatus in accordance with the invention could be used to correct the overflow detected by the CCD, whether an object upon which the image is being focused upon or not, in an alternative embodiment. Thus, as is shown in FIGS. 5A–5C, a user may define various regions of the image to be tested for correction. In FIG. 5A an area A is shown, in FIG. 5B areas B are shown, and in FIG. 5C area C is shown. In order to ensure that the areas to be corrected are background areas in this preferred embodiment, qualifier 430 determines whether an area having an overflow condition is present in at least two areas, thus in area A and B, or B and C, etc. If present in such an overlapping area, it is more likely that the portion of the image to be corrected is background material. Any area defined by a user could be used. Additionally, if desired, only one portion of a defined area need be checked, and not overlapping areas.

Figure 5A:
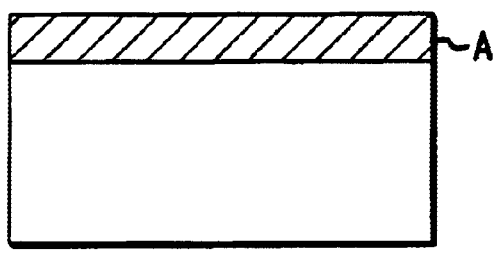
FIGS. 5A–5D depict various qualifying areas of an image.
Figure 5B:
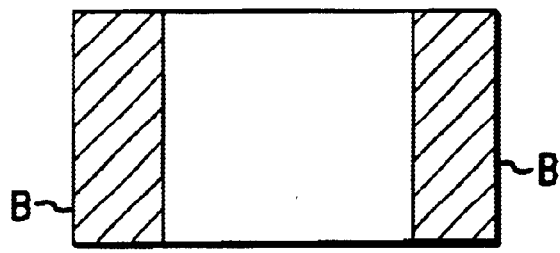
Figure 5C:
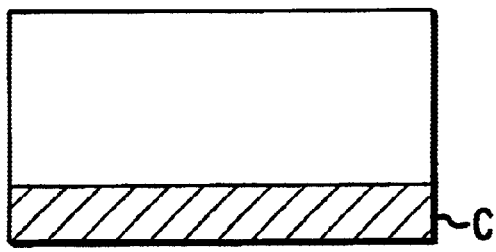
Figure 5D:
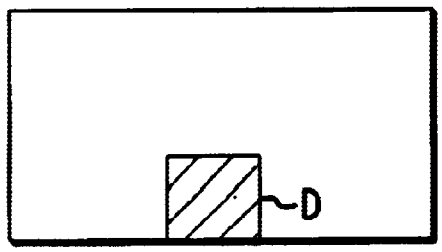

The areas in FIGS. 5A–5C may either each be tested in the same frame of video, or alternatively, it is possible to test whether an overflow area falls within area A in FIG. 5A in a first frame, area B in FIG. 5B in a second frame, area C of FIG. 5C in a next frame, and area D of FIG. 5D of a final frame. Thus, the test can be performed either all at once in a single frame, requiring a more complicated apparatus, but generating additional speed, or in consecutive frames, one frame at a time, requiring a lower processing capability, but sacrificing a small amount of speed therefor.

As is shown in FIG. 5D, an area D representing a specific object may be tested. In accordance with the preferred embodiment, it may be desirable to correct this portion even though it is a more important object in the image, if the object appears dark in the image. If the object appears too light in the image, it may not be necessary to correct the object. Thus, user defined parameters allow for the determination of whether to correct various particular images. While the qualification scheme depicted in FIGS. 5A–5B apply for correction of larger portions of the image, it is possible to use any other qualifying scheme to determine a portion of an image having an overflow situation which is desired to be corrected by a user.

After it has been determined that the overflow portion of the image to be corrected falls within a qualified area of the image, and is in fact a portion of the image that it is desired to correct, edge detector 440 acts upon the overflow area to define the precise edge of the overflow area to be corrected. Thus, it is determined exactly which portions of the image are to be corrected, and which portion are not to be effected at all. Edge detector 440 comprises a standard edge detector that is well known in the art.

Once the specific portions of the image to be corrected have been determined, control passes to correction level unit 450 which determines the actual correction level for each portion of the image to be corrected as defined by edge detector 440.

Correction level unit 450 can operate in a number of ways. In a preferred embodiment of the invention, correction level unit 450 operates in an iterative mode. Thus, each portion of the image to be corrected as defined by edge detector 440 in a first iteration is intended to be reduced by the same percentage of light received. Thus, by way of example, all overflow portions of the image which are to be corrected have the light received thereby reduced by 10 percent as compared to a baseline provided by black reference 460. This correction factor is output from correction level unit 450, of correction processor 410 to voltage driver 420. As will be described below, voltage driver 420 adjusts the desired pixels to receive only 90% of the original light. Upon receipt of the next frame from storage device 130, the processing of correction processor 410 is repeated. In all likelihood, upon this iteration, some of the areas of the image may have been corrected sufficiently and some may not have been corrected enough. Thus, upon a further operation of qualifier 430 and edge detector 440, correction level unit 450 determines the prior correction level of an area, and if that area still presents an overflow condition, reduces the light received thereto an additional percentage, for example 10%. Thus, overflow areas have 20% less light received thereby as controlled by voltage driver 420. This iterative process continues for consecutive or regularly spaced frames until all previously defined overflow areas do not present overflows. Thereafter, the percent reduction in light received is maintained for each area. If areas later present an overflow, the light received by them may be further reduced. In this manner, through an iterative process of a number of frames, the light received by the various portions of CCD imaging unit 200 provides an image which does not include any overflow situations.

After all areas have been properly adjusted, and all are maintained within a predetermined range, monitoring continues, the same corrections being applied until an area moves outside of a predetermined charge range and presents an overflow condition once again. It is also desirable to restart the testing procedure each predetermined number of frames so that accurate readings can be provided. Thus, in such iterative manner, various portions of the image can be corrected.

The frames to be utilized for testing in this iterative procedure can be provided in a number of ways. First, in a standard 60 Hz CCD imaging scheme, for example, every fifth frame is used not for imaging, but rather for testing. Thus, a standard CCD imaging apparatus could be utilized, with the tester added thereto. Alternatively, for more accurate control, it is possible to provide a double time CCD, therefore testing at 120 Hz, and utilizing every other frame for testing. Thus, the standard 60 frames per second are provided to a video recorder or the like for each image, while a continuous testing scheme could also be employed.

In an alternative embodiment, it is possible to perform testing on a single frame rather than in an iterative manner. Rather than sampling light values for an entire frame, a reduced time frame is used for receiving light at each imaging element of the CCD imaging unit in this shortened time frame in which none of the imaging elements overflow. In this shortened time frame, based upon the accumulated charge in each photosensor, a graph is generated having a slope for each, and to make a determination of the percentage overflow or underflow that results at each photosensor during a full duty cycle. Armed with this information, correction processor 410 may be utilized to determine various areas to be corrected. Correction level unit 450 however, rather than operating in an iterative manner, is able to estimate the percentage correction required for the image elements for each area to be corrected based upon the slope of the information from the single tested image. Thus, correction is provided on an immediate basis. Furthermore, like the original embodiment, testing is regularly provided to ensure images remain within a predetermined level, and each predetermined number of frames are provided to ensure accuracy.

After portions of the image to be corrected, and the amount of each image is to be corrected have been determined, this information is passed to voltage driver 420. Referring once again to FIGS. 3A and 3B in addition to FIG. 4, each of the imaging elements 210 contained within a region defined by edge detector 440 receives the same correction factor. As is shown in FIG. 3B, the overflow gate control 330 and potential level applied to 330A, is reduced to a level 330C for a desired amount of time. If the amount of light to be received by the photosensor is to be reduced by 50%, 50% of the duty cycle for collection of light at photosensor 310 will include a voltage reduction of the overflow control gate 330 to level 330C. Thus, for the first half of the cycle time in which the photosensors of the apparatus receive light, the charge associated with this received light for the particular photosensor is dumped to a drain. Thereafter, the level of overflow control gate is returned to its normal voltage level 330A, and light in the area is collected. In this manner, overflow will not occur, but rather less light is collected in the areas that typically would produce an overflow condition. Each different area of the image to be corrected will include a different timing sequence for the voltage level of overflow control gate 330. However, all of the control gates in a particular defined area include the same timing. This procedure ensures that slight differences in lighting between pixel elements within a same area will be noticeable, but in general the overall area is adjusted so as not to provide an overflow or an underflow condition.

Therefore, in accordance with the invention, a method and apparatus are provided for correcting an overflow or underflow condition in various defined portions of an image. While these portions are corrected, other portions of the image are not affected at all, therefore allowing for images having differing characteristics to be simultaneously viewed by a user. While the invention has been primarily described for overflow conditions, underflow conditions (i.e., dark areas) can also be corrected. By way of example, if a dark area is determined to require 100% more light by the methods noted above, the duty cycle for the entire image is increased by 100%, and then the portion of the image not to be corrected (that might now produce an overflow) has the amount of light received adjusted by the procedure noted above.

It will thus be seen that the objects set forth above, among those made apparent from the preceding description are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also intended that the following claims are intended to cover all the generic and specific features of the invention hereindescribed and all statements of the scope of the invention which, as a matter of language, might be said to fall therebetween.

What is claimed:

1. An apparatus for applying a selective shutter to an imaging device, comprising:

a CCD unit for receiving an image;

means for determining a portion of said received image that presents a light overflow condition, said portion comprising less than all of a plurality of pixels comprising said image; and means for selectively reducing an amount of time that light from said portion of said image presenting said overflow condition is received at said pixels of said CCD unit corresponding to said portion so as to eliminate said overflow condition.

2. The apparatus of claim 1, wherein said CCD unit comprises a plurality of individual imaging elements, each of said individual imaging elements receiving light from said image for a time period corresponding to a predetermined duty cycle, and wherein individual imaging elements corresponding to said portion of said received image that presents said overflow condition are connected to a current drain for a predetermined amount of time during said duty cycle to reduce the amount of time said determined portion of said imaging elements receives light from said image.

3. An apparatus for applying a selective shutter to an imaging device, comprising:
a CCD unit for receiving an image;
means for determining a portion of said received image that presents a light overflow condition; and
means for selectively reducing an amount of time that light from said portion of said image presenting said overflow condition is received so as to eliminate said overflow condition;
wherein said CCD unit comprises a plurality of individual imaging elements, each of said individual imaging elements receiving light from said image for a time period corresponding to a predetermined duty cycle;
wherein individual imaging elements corresponding to said portion of said received image that presents said overflow condition are connected to a current drain for a predetermined amount of time during said duty recycle to reduce the amount of time said determined portion of said imaging elements receives light from said image; and
wherein said predetermined amount of time is determined in accordance with an iterative process, said predetermined amount of time being increased during consecutive images until said determined portion of said image no longer presents an overflow condition.

4. An apparatus for applying a selective shutter to an imaging device, comprising:
a CCD unit for receiving an image;
means for determining a portion of said received image that presents a light overflow condition; and
means for selectively reducing an amount of time that light from said portion of said image presenting said overflow condition is received so as to eliminate said overflow condition;
wherein said CCD unit comprises plurality of individual imaging elements, each of said individual imaging elements receiving light from said image for a time period corresponding to a predetermined duty cycle;
wherein individual imaging elements corresponding to said portion of said received image that presents said overflow condition are connected to a current drain for a predetermined amount of time during said duty cycle to reduce the amount of time said determined portion of said imaging elements receives light from said image; and
wherein said predetermined amount of time is determined by testing a single image to determine a percentage overflow, and setting said predetermined amount of time as a function of said percentage overflow.

5. The apparatus of claim 2, further comprising an overflow control gate coupled between each individual imaging element and said current drain, wherein a voltage applied to said overflow control gate is reduced for said predetermined amount of time to allow charge to flow from each of said individual imaging elements corresponding to said determined portion of said image to said current drain.

6. An apparatus for applying a selective shutter to an imaging device, comprising:
a CCD unit for receiving an image;
means for determining a portion of said received image that presents a light overflow condition; and
means for selectively reducing an amount of time that light from said portion of said image presenting said overflow condition is received so as to eliminate said overflow condition;
wherein said CCD unit comprises a plurality of individual imaging elements, each of said individual imaging elements receiving light from said image for a time period corresponding to a predetermined duty cycle; and
wherein individual imaging elements corresponding to said portion of said received image that presents said overflow condition are connected to a current drain for a predetermined amount of time during said duty cycle to reduce the amount of time said determined portion of said imaging elements receives light from said image;
the apparatus further comprising on overflow control gate coupled between each individual imaging element and said current drain, wherein a voltage applied to said overflow control gate is reduced for said predetermined amount of time to allow charge to flow from each of said individual imaging elements corresponding to said determined portion of said image to said current drain; and
wherein said predetermined amount of time is determined in accordance with an iterative process, said predetermined amount of time being increased during consecutive images until said determined portion of said image no longer presents an overflow condition.

7. An apparatus for applying a selective shutter to an imaging device, comprising:
a CCD unit for receiving an image;
means for determining a portion of said received image that presents a light overflow condition; and
mean for electively reducing an amount of time that light from said portion of said image presenting said overflow condition is received so as to eliminate said overflow condition;
wherein said CCD unit comprises a plurality of individual imaging elements, each of said individual imaging elements receiving light from said image for a time period corresponding to a predetermined duty cycle; and
wherein individual imaging elements corresponding to said portion of said received image that presents said overflow condition are connected to a current drain for a predetermined amount of time during said duty cycle to reduce the amount of time said determined portion of said imaging elements receives light from said image;
the apparatus further comprising an overflow control gate coupled between each individual imaging element and said current drain, wherein a voltage applied to said overflow control gate is reduced for said predetermined amount of time to allow charge to flow from each of said individual imaging elements corresponding to said determined portion of said image to said current drain; and
wherein said predetermined amount of time is determined by testing a single image to determine a percentage overflow, and setting said predetermined amount of time as a function of said percentage overflow.

8. An apparatus for applying a selective shutter to an imaging device, comprising:
a CCD unit for receiving an image;
means for determining a portion of said received image that presents a light overflow condition;

means for selectively reducing an amount of time that light from said portion of said image presenting said overflow condition is received so as to eliminate said overflow condition; and an edge detector for determining a precise edge of said portion of said received image that presents said overflow condition.

9. An apparatus for adjusting an amount of light received from a portion of an image, comprising:

a CCD unit for receiving an image, said CCD unit comprising a plurality of individual imaging elements;

a plurality of overflow control gates, each selectively coupling one of said plurality of individual imaging elements to an overflow current drain;

means for determining a portion of said image that causes a respective plurality of said individual imaging elements to overflow;

means for determining an average amount of overflow for all of said plurality of individual imaging elements in said determined portion of said image; and means for determining an appropriate amount of time for coupling each of said individual imaging elements in said determined portion of said image to said overflow current drain via said associated overflow control gate so that said individual imaging elements do not overflow.

10. A method for applying a selective shutter to an imaging device, comprising:

receiving an image by a CCD unit;

determining a portion of said received image that presents a light overflow condition said portion comprising less than all of a plurality of pixels comprising said image; and selectively reducing an amount of time that light from said portion of said image presenting said overflow condition is received at said pixels of said CCD unit corresponding to said portion so as to eliminate said overflow condition.

11. The method of claim 10, wherein said CCD unit comprises a plurality of individual imaging elements, each of said individual imaging elements receiving light from said image for a time period corresponding to a predetermined duty cycle, and connecting to a current drain for a predetermined amount of time during said duty cycle individual imaging elements corresponding to said portion of said received image that presents said overflow condition to reduce the amount of time said determined portion of said imaging elements receives light from said image.

12. A method for applying a selective shutter to an imaging device, comprising:

receiving an image by a CCD unit;

determining a portion of said received image that presents a light overflow condition; and selectively reducing an amount of time that light from said portion of said image presenting said overflow condition is received so as to eliminate said overflow condition;

wherein said CCD unit comprises a plurality of individual imaging elements, each of said individual imaging elements receiving light from said image for a time period corresponding to a predetermined duty cycle; and connecting to a current drain for a predetermined amount of time during said duty cycle individual imaging elements corresponding to said portion of said received image that presents said overflow condition to reduce the amount of time said determined portion of said imaging elements receives light from said image;

wherein said predetermined amount of time is determined in accordance with an iterative process, said predetermined amount of time being increased during consecutive images until said determined portion of said image no longer presents an overflow condition.

13. A method for applying a selective shutter to an imaging device, comprising:

receiving an image by a CCD unit, said CCD unit comprising a plurality of individual imaging elements, each of said individual imaging elements receiving light from said image for a time period corresponding to a predetermined duty cycle;

determining a portion of said received image that presents a light overflow condition;

selectively reducing an amount of time that light from said portion of said image presenting said overflow condition is received so as to eliminate said overflow condition; and connecting to a current drain for a predetermined amount of time during said duty cycle individual imaging elements corresponding to said portion of said received image that presents said overflow condition to reduce the amount of time said determined portion of said imaging elements receives light from said image;

wherein said predetermined amount of time is determined by testing a single image to determine a percentage overflow, and setting said predetermined amount of time as a function of said percentage overflow.

14. The method of claim 11, further comprising the steps of coupling an overflow control gate between each individual imaging element and said current drain, and reducing a voltage applied to said overflow control gate for said predetermined amount of time to allow charge to flow from each of said individual imaging elements corresponding to said determined portion of said image to said current drain.

15. A method for applying a selective shutter to an imaging device, comprising:

receiving an image by a CCD unit, said CCD unit comprising a plurality of individual imaging elements, each of said individual imaging elements receiving light from said image for a time period corresponding to a predetermined duty cycle;

determining a portion of said received image that presents a light overflow condition;

selectively reducing an amount of time that light from said portion of said image presenting said overflow condition is received so as to eliminate said overflow condition;

connecting to a current drain for a predetermined amount of time during said duty cycle individual imaging elements corresponding to said portion of said received image that presents said overflow condition to reduce the amount of time said determined portion of said imaging elements receives light from said image; and coupling an overflow control gate between each individual imaging element and said current drain, and reducing a voltage applied to said overflow control gate for said predetermined amount of time to allow charge to flow from each of said individual imaging elements corresponding to said determined portion of said image to said current drain;

wherein said predetermined amount of time is determined in accordance with an iterative process, said predetermined amount of time being increased during consecutive video images until said determined portion of said image no longer presents an overflow condition.

16. A method for applying a selective shutter to an imaging device, comprising:

receiving an image by a CCD unit, said CCD unit comprising a plurality of individual imaging elements, each of said individual imaging elements receiving light from said image for a time period corresponding to a predetermined duty cycle;

determining a portion of said received image that presents a light overflow condition;

selectively reducing an amount of time that light from said portion of said image presenting said overflow condition is received so as to eliminate said overflow condition;

connecting to a current drain for a predetermined amount of time during said duty cycle individual imaging elements corresponding to said portion of said received image that presents said overflow condition to reduce the amount of time said determined portion of said imaging elements receives light from said image; and coupling an overflow control gate between each individual imaging element and said current drain, and reducing a voltage applied to said overflow control gate for said predetermined amount of time to allow charge to flow from each of said individual imaging elements corresponding to said determined portion of said image to said current drain;

wherein said predetermined amount of time is determined by testing a single image to determine a percentage overflow, and setting said predetermined amount of time as a function of said percentage overflow.

17. A method for applying a selective shutter to an imaging device, comprising:

receiving an image by a CCD unit;

determining a portion of said received image that presents a light overflow condition;

selectively reducing an amount of time that light from said portion of said image presenting said overflow condition is received so as to eliminate said overflow condition; and determining a precise edge of said portion of said received image that presents said overflow condition.

18. A method for adjusting an amount of light received from a portion of an image, comprising:

receiving an image by a CCD unit, said CCD unit comprising a plurality of individual imaging elements;

selectively coupling each of a plurality of overflow control gates to each of said plurality of individual imaging elements and an overflow current drain for selective coupling;

determining a portion of said image that causes a respective plurality of said individual imaging elements to overflow;

determining an average amount of overflow for all of said plurality of individual imaging elements in said determined portion of said image; and determining an appropriate amount of time for coupling each of said individual imaging elements in said determined portion of said image to said overflow current drain via said associated overflow control gate so that said individual imaging elements do not overflow.

* * * * *